Jan. 5, 1960 D. RICHMAN 2,920,287

VARIABLE-DELAY SYSTEM

Filed June 9, 1955 2 Sheets-Sheet 1

Jan. 5, 1960 D. RICHMAN 2,920,287

VARIABLE-DELAY SYSTEM

Filed June 9, 1955 2 Sheets-Sheet 2

United States Patent Office 2,920,287

Patented Jan. 5, 1960

2,920,287

VARIABLE-DELAY SYSTEM

Donald Richman, Fresh Meadows, N.Y., assignor to Hazeltine Research, Inc., Chicago, Ill., a corporation of Illinois Application June 9, 1955, Serial No. 514,343

8 Claims. (Cl. 332—1)

*General*

This invention relates to variable-delay systems and, particularly, to such systems for imparting an adjustable time delay to electrical signals translated thereby.

For many applications it would be desirable to have a delay system for varying the time delay of an electrical input signal in accordance with an electrical control signal so as to be able to rearrange the time sequence of information contained in the input signal in any desired manner. For one thing, such a system could be utilized to enable transmission of an increased amount of information over a channel of limited band width.

Previously proposed delay lines of fixed length, of course, offer no solution to the problem. The use of a tapped delay line and a plurality of mechanical switches for switching between the various taps to determine the length of delay line over which the different portions of the signal information are to be translated is also inadequate for many applications because the delay increments are not continuously variable, the switching action is too slow, or the apparatus is more cumbersome and complex than is desirable. The use of electronic switches, such as beam-deflection switching tubes, in place of the mechanical switches is also undesirable because of increased circuit complexity necessitated thereby and the high power required for rapid wide-bandwidth switching.

It is an object of the invention, therefore, to provide a new and improved variable-delay system which substantially avoids one or more of the foregoing limitations of delay systems heretofore proposed.

It is another object of the invention to provide a new and improved variable-delay system for individually varying the time delay of discrete elements of an electrical input signal in accordance with an electrical control signal.

The results obtainable by the use of the present invention are similar to those obtainable by an alternative form of variable-delay system disclosed and claimed in applicant's copending application Serial No. 476,637, entitled, "Variable Delay System," filed December 21, 1954, now Patent No. 2,824,227 issued February 18, 1958. The present invention, however, utilizes different techniques and operating principles in obtaining the desired results.

In accordance with the invention, a variable-delay system for individually varying the time delay of discrete elements of an input signal comprises circuit means for converting the time positions of discrete elements of the input signal to representative frequencies. The system also includes circuit means for sustaining the representative frequencies over extended time intervals. The system further includes adjustable frequency-selective circuit means for selectively reconverting the representative frequencies to desired time positions within the extended time intervals to produce an output signal composed of the discrete elements of the input signal individually delayed in a desired manner.

For a better understanding of the present invention, together with other and further objects thereof, reference is had to the following description taken in connection with the accompanying drawings, and its scope will be pointed out in the appended claims.

Referring to the drawings.

Figure 1:
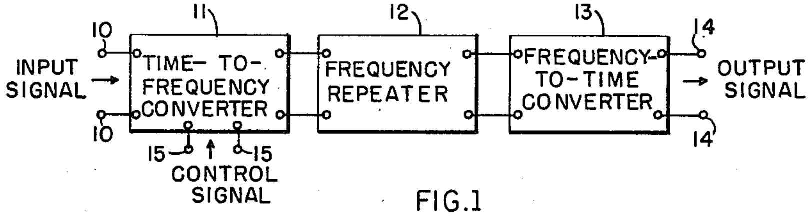
Fig. 1 is a schematic diagram showing the primary aspects of the present invention.

*Description and operation of Fig. 1 system*

Referring to Fig. 1 of the drawings, the variable-delay system there shown indicates in a general manner the primary elements of the present invention. The basic idea is to convert the time factor of each discrete element of an electrical signal supplied to the input terminals 10, 10 to a representative frequency factor and then selectively to reconvert the various frequency factors back into time factors in such a manner that the output signal is composed of the same discrete elements of information as contained in the input signal except that the time of occurrence of these discrete elements in the output signal is rearranged in a desired manner. To this end, the system includes circuit means, represented by a time-to-frequency converter 11, for converting the time positions of discrete elements of the input signal to representative frequencies. The system also includes circuit means, represented by a frequency repeater 12, for sustaining the representative frequencies over extended time intervals. Lastly, the system includes adjustable frequency-selective circuit means, represented by a frequency-to-time converter 13, for selectively reconverting the representative frequencies to desired time positions within the extended time intervals to produce an output signal at a pair of output terminals 14, 14 which is composed of the discrete elements of the input signal individually delayed in a desired manner.

Considering the input signal supplied to the terminals 10, 10 as being composed of a series of amplitude elements occurring over discrete time intervals, the time-to-frequency converter 11 is effective to encode each of these discrete elements as modulation of a carrier signal of unique frequency. The term "unique" is not wholly accurate as will subsequently become apparent, but is presently used to facilitate ease of understanding. The term "carrier signal" is used to denote the fact that the frequencies of the signals upon which the discrete elements are encoded are considerably higher than the highest frequency component of any importance that may be present in the input signal supplied to the input terminals 10, 10.

The modulated carrier-signal components are subsequently supplied to the frequency repeater 12 which is effective to sustain each of these modulated carrier-signal components over an extended time interval. In other words, the frequency repeater 12 is responsive to each of the carrier frequencies to sustain the existence of a signal at each of these frequencies, the amplitude of which is representative of the amplitude of the corresponding discrete element of the input signal. In this manner, each of the discrete amplitude elements of the input signal is effectively preserved in time as the amplitude of a corresponding and continuing carrier signal of unique frequency.

These sustained carrier-frequency components are, in turn, supplied to the frequency-to-time converter 13 which has a time-varying frequency-response characteristic and includes suitable detector means for recovering the encoded amplitude information. As a result, the converter 13 at any instant acts to translate a particular carrier frequency and reconvert the amplitude information thereof into an output signal component. In this fashion, as time passes, the converter 13 is selectively responsive to the sustained carrier frequencies to retrieve all the input amplitude information in a desired time sequence.

Where the time-varying frequency-response characteristic of the decoding converter 13 is varying in a known manner, the moment at which amplitude information is reconverted into an output signal element may be controlled by supplying a suitable control signal by way of a pair of terminals 15, 15 to the encoding converter 11. This is possible because each carrier frequency at the encoding converter 11 represents a corresponding decoding time at the decoding converter 13. Thus, to give a particular discrete element of the input signal a desired time delay, all that is required is that the control signal be adjusted to produce the proper carrier frequency at the instant that this discrete element is supplied to the converter 11.

As an alternative, the time-to-frequency conversion of converter 11 may be made to vary in a regular and known manner so that a discrete element of the input signal occurring at a given instant is automatically encoded at a particular frequency of the carrier signal. In this case, the control signal is supplied to the decoding converter 13 and the moment at which a discrete element will appear in the output signal depends on the instant at which the converter 13 is responsive to the frequency at which it was initially encoded on the carrier signal.

Figure 2:
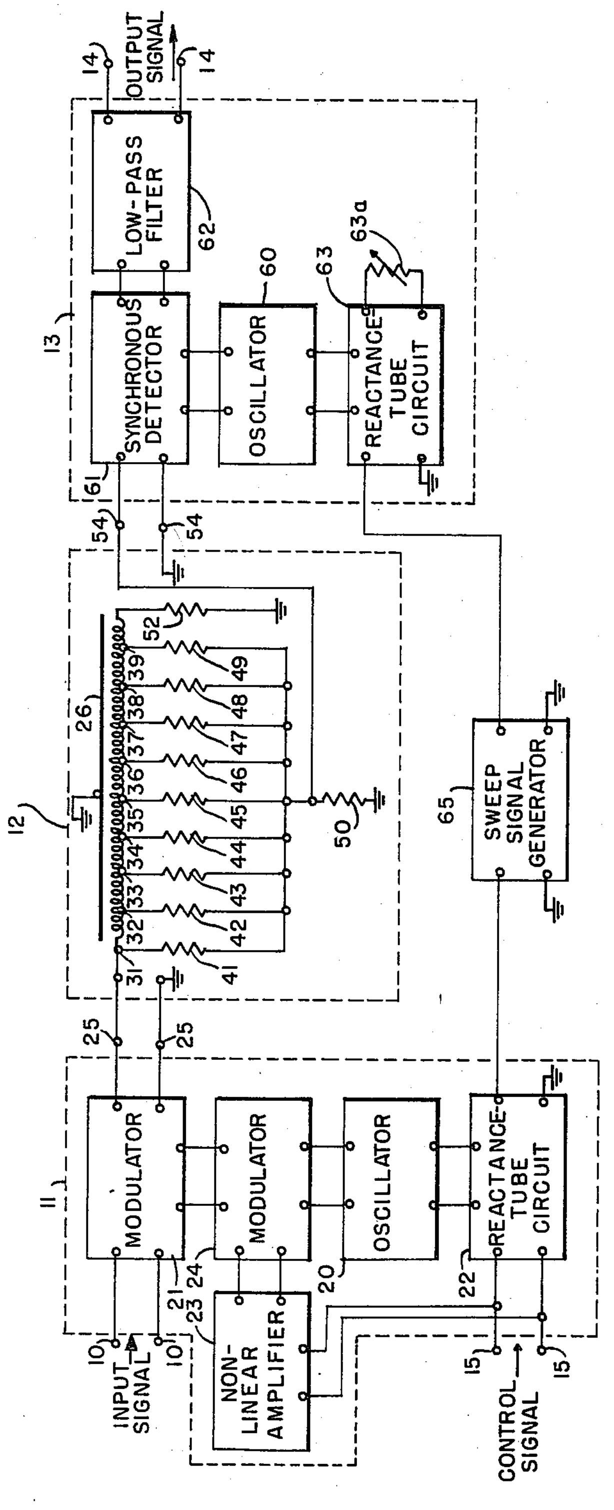
Fig. 2 is a more detailed circuit diagram, partly schematic, of one form of variable-delay system constructed in accordance with the present invention.

*Description of Fig. 2 system*

Referring now to Fig. 2 of the drawings, there is shown in more detail one form of a variable-delay system of the type described in Fig. 1. The dashed-line boxes 11, 12, and 13 of Fig. 2 correspond to the similarly numbered units of the Fig. 1 system. The Fig. 2 variable-delay system for individually varying the time delay of discrete elements of an input signal comprises circuit means, represented by an encoding unit 11, for individually encoding various discrete elements of the input signal supplied to a pair of input terminals 10, 10 as amplitude modulation of a variable-frequency carrier signal at various frequencies thereof. The encoding unit 11 may include, for example, a first oscillator circuit 20 for developing a first carrier signal having a frequency which is adjustable over a predetermined frequency range. The encoding unit 11 additionally may include a modulator 21 for encoding various discrete elements of the input signal as modulation of the first carrier signal. The encoding unit 11 may further include a reactance-tube circuit 22 for controlling the operating frequency of the oscillator 20. Also shown within the encoding unit 11 are a nonlinear amplifier 23 and a modulator 24 which, where desirable, may be utilized to compensate for certain types of signal distortion as will be mentioned hereinafter.

The variable-delay system also includes circuit means, represented by a frequency repeater 12, for sustaining over extended time intervals the various frequency components upon which the discrete elements of the input signal are encoded. The frequency repeater 12 may be, for example, a type of network commonly referred to as a "comb filter" and which includes a delay network 26 having a plurality of time-spaced output terminals 31—39, inclusive, for repeating the modulated carrier-signal components with a plurality of different time delays. Coupled to each of the time-spaced output terminals 31–39, inclusive, are corresponding coupling resistors 41–49, inclusive, the other ends of which are coupled to one end of a common load resistor 50. The far end of the delay network 26 is terminated by an impedance-matching resistor 52 for preventing reflection of signal energy therefrom. The input end of the delay network 26 is coupled to a pair of terminals 25, 25 while the load resistor 50 is coupled to a pair of output terminals 54, 54.

The variable-delay system further includes frequency-responsive circuit means, represented by a decoding unit 13, for selectively decoding the modulation of the sustained carrier-signal components to produce an output signal at a pair of output terminals 14, 14 which is composed of the discrete elements of the input signal individually delayed in a desired manner. The decoding unit 13 may include, for example, a second oscillator circuit 60 for developing a second carrier signal having a frequency which is adjustable over the same predetermined frequency range as the previously mentioned first oscillator 20. The decoding unit 13 also includes a synchronous frequency detector 61 responsive to the instantaneous frequency of the second carrier signal for selectively decoding the modulation of the sustained carrier-signal component in frequency synchronism therewith. In addition, the decoding unit 13 may include a low-pass filter 62 for preventing translation of extraneous frequency components produced by the synchronous detector 61. Also, a reactance-tube circuit 63 having an adjustable parameter 63*a* may be utilized to control the instantaneous frequency of the oscillator 60.

In addition to the above, the variable-delay system includes circuit means responsive to the control signal for controlling the instantaneous difference in frequencies of the first and second carrier signals generated, respectively, by oscillators 20 and 60. Such means may include a pair of control-signal input terminals 15, 15 and the reactance-tube circuit 22.

The variable-delay system may further include frequency-control circuit means for causing the frequencies of the first and second carrier signals to sweep over approximately the same predetermined frequency range. Such means may include, for example, a sweep-signal generator 65 which is coupled to each of the reactance-tube circuits 22 and 63 for producing the desired frequency sweeps.

Figure 3:
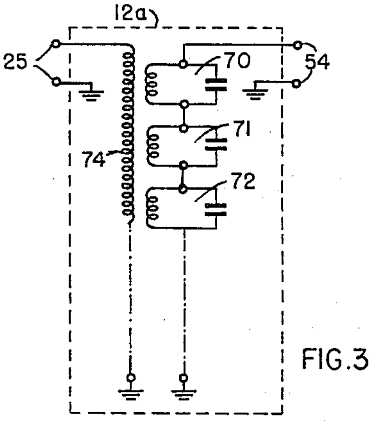
Figs. 3 and 4 are circuit diagrams of alternative units that may be utilized in the Fig. 2 system.
Figure 4:
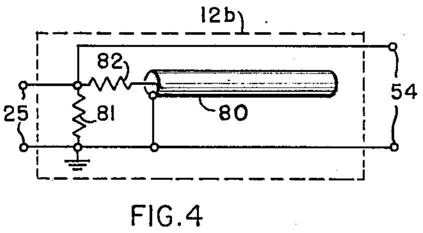

Instead of utilizing a comb filter as shown in Fig. 2, the frequency repeater 12 may, in the alternative, include, for example, either of the circuits shown in Fig. 3 or Fig. 4. The Fig. 3 unit 12*a* shows a plurality of tuned ringing circuits, represented by circuits 70–72, inclusive, fed by a common transformer winding 74 for individually sustaining the appropriate frequencies to which they are tuned thereby to sustain the carrier-signal components in the desired manner. For simplicity, only three ringing circuits are shown. Unit 12*a*, however, may include many times this number of such circuits. The Fig. 4 frequency repeater 12*b* shows the use of a section of high-Q transmission line 80 which is open-circuited at the far end and serves to produce time-spaced multiple reflections of each carrier-frequency component which may be utilized in a manner analogous to the repeated signals supplied by the delay network 26 of Fig. 2. To this end, the impedance presented to the input end of the line 80, which impedance is determined by the values of an input resistor 81 and a coupling resistor 82, is preferably chosen to produce a mismatch with the line 80. Either of the Fig. 3 or Fig. 4 circuits may be utilized in place of the comb filter of Fig. 2 by coupling the appropriate terminals thereof to the correspondingly numbered terminals in the Fig. 2 system.

The units 20–24, inclusive, 60–63, inclusive, and 65, taken individually and without reference to their function in the present invention, may be of conventional construction and operation so that a detailed description and explanation of the operation thereof are unnecessary herein.

*Operation of Fig. 2 system*

Considering the operation of the variable-delay system just described, the system is effective to convert a time scale to a frequency scale and then to reconvert from frequency into time. To this end the encoding units within the dashed-line box 11 are effective to perform the initial conversion from time to frequency. The nonlinear amplifier 23 and the modulator 24, however, are utilized primarily to perform a corrective or compensating operation which may or may not be required. Hence, a discussion of these units will be deferred for the present.

Figure 5:
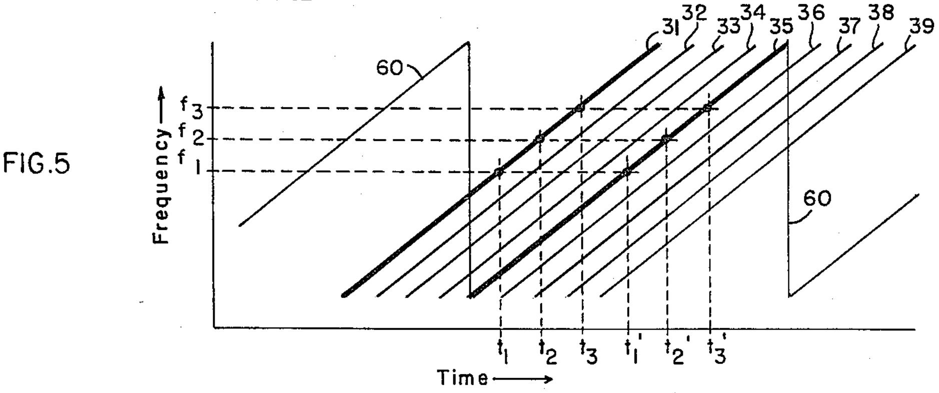
Figs. 5 and 6 are graphs utilized in explaining the operation of the Fig. 2 system.

Oscillator 20 of the encoding unit 11 is effective to produce oscillations of frequency considerably higher than the highest frequency component of any importance that may be present in the video-type input signal supplied to input terminals 10, 10. Hence, this oscillator signal is referred to as a carrier signal. The frequency of oscillation of oscillator 20 may be varied in a conventional manner by means of the reactance-tube circuit 22 which, in turn, is responsive to electrical control signals supplied thereto. The modulator 21 is effective to encode discrete amplitude elements of the input signal upon the carrier signal supplied thereto by the oscillator 20. It is desirable to encode each discrete amplitude element upon the carrier signal at a different frequency thereof. Accordingly, a voltage sweep signal is supplied to the reactance-tube circuit 22 by the sweep-signal generator 65, and the reactance-tube circuit 22, in turn, causes the frequency of oscillator 20 to vary in a linear manner over a predetermined frequency range. Obviously, the entire radio spectrum cannot be utilized in practical equipment and, therefore, the frequency sweeps of oscillator 20 are limited in range and are made to be periodic in nature. Referring to the graph of Fig. 5, a representative frequency sweep is represented by curve 31 thereof. It is to be emphasized that the vertical axis of the Fig. 5 graph represents frequency and, hence, the curves of the graph denote frequency variations with respect to time. Thus, it may be seen that discrete amplitude elements occurring, for example, at times $t_1$, $t_2$, and $t_3$ are encoded upon the carrier signal at representative frequencies $f_1$, $f_2$, and $f_3$, respectively, as indicated by curve 31. The amplitude information is, thus, preserved as the amplitude of the modulation of the carrier signal. For convenience, curve 31 shows only the linearly rising portion of one encoding frequency sweep.

The encoded carrier signal developed in the modulator 21 is, in turn, supplied to the frequency repeater 12. Considering the representative frequency sweep of curve 31 as an entity, then it is apparent that this frequency sweep is translated down the delay network 26 in such a manner that the frequency sweep appears at subsequent output terminals 32–39, inclusive, at later moments of time. The frequency sweeps appearing at these output terminals 32–39, inclusive, are represented by the correspondingly numbered curves 32–39, inclusive, of the Fig. 5 graph. The time delay between the appearance of the frequency sweep at each of the output terminals is determined by the time delay of the intervening portion of the delay network 26. Now, because the far ends of the coupling resistors 41–49, inclusive, are coupled together across a common load resistor 50, the delayed frequency sweeps 32–39, inclusive, as well as the initial frequency sweep 31 appear across the load resistor 50. Thus, the frequency sweeps appearing across the load resistor 50 may be thought of as a primary frequency sweep 31 and a number of images thereof. In this manner, the amplitude information which is riding along as modulation of the various carrier signal frequencies is preserved in time or, in other words, each frequency component is sustained over an extended time interval corresponding to the total length of the delay network 26.

The primary frequency sweep represented by curve 31 and the images thereof represented by curves 32–39, inclusive, are effectively subsequently supplied to the decoding units represented within the dashed-line box 13. These units are effective to reconvert the representative carrier frequencies back into desired time positions in an output signal. To this end, the oscillator 60 is controlled by way of the voltage sweep signal supplied to the reactance-tube circuit 63 to produce periodic frequency variations or frequency sweeps in a manner similar to those produced by the oscillator 20 of the encoding unit 11. The frequency variations of the oscillator 60 are represented in the Fig. 5 graph by curve 60. It will be noted that portions of three frequency-sweep periods of oscillator 60 are shown and that the frequency sweep of oscillator 60 occurring over the middle period, as represented on the Fig. 5 graph, coincides with and lies on top of the corresponding image 35 of the encoding frequency sweep 31.

The frequency sweeps of oscillator 60 are supplied to the synchronous detector 61 and are effective to control the signal-translating characteristics of the synchronous detector. More specifically, the synchronous detector will translate the modulation components of a signal supplied thereto by way of terminals 54, 54 whenever the carrier frequency and phase of such signal are the same as the frequency and phase of the signal supplied to the synchronous detector 61 by the oscillator 60. Such synchronous detectors are well known in the color-television art so that a detailed description of the internal operation thereof appears unnecessary. Now, as mentioned, the decoding frequency sweep 60 of oscillator 60 is coincident in time with the repeated image 35 of the encoding frequency sweep 31. Accordingly, there is frequency synchronism between the decoding sweep 60 and the image sweep 35 and, hence, the synchronous detector 61 is effective to pass the amplitude information encoded at frequencies $f_1$, $f_2$, and $f_3$ at the corresponding times $t_1'$, $t_2'$, and $t_3'$. Because the frequency sweep of oscillator 60 is identical to the frequency sweep of the encoding oscillator 20 except that the sweep of oscillator 60 occurs at a fixed later time, each of the amplitude elements under consideration is reproduced as an element of the output signal at later moments of time such that the delay for each element is the same. In other words, the operation depicted by the Fig. 5 graph represents the situation where a fixed time delay is imparted to the input signal initially supplied to terminals 10, 10. The magnitude of such a fixed time delay may be adjusted, for example, by adjusting a parameter **63*a* associated with the reactance-tube circuit 63 thereby to control the relative time difference between the occurrence of the frequency sweeps of oscillators 20 and 60**.

The length of the delay network 26 which is utilized in the frequency repeater 12 is preferably equal to the period of the periodic frequency sweeps in order to prevent any ambiguity in the resulting output signal at the terminals 14, 14. In other words, because the encoding carrier signal is periodic, one period of which is depicted by curve 31 of Fig. 5, later amplitude elements of the input signal will be periodically encoded at the same frequency. It is thus necessary that the extended time interval over which a particular amplitude element is sustained not be allowed to exceed the moment when a later amplitude element is encoded at the same carrier frequency, otherwise both elements will be detected by the synchronous detector 61 at the same time. Whether any ambiguity or confusion will, in fact, result depends upon the type of input signal that is being translated as well as upon the type of time delay that is sought to be imparted to the individual amplitude elements thereof. Accordingly, for certain applications it may be permissible to utilize a length of the delay network 26 which is greater than the period of the periodic frequency sweep.

Figure 6:
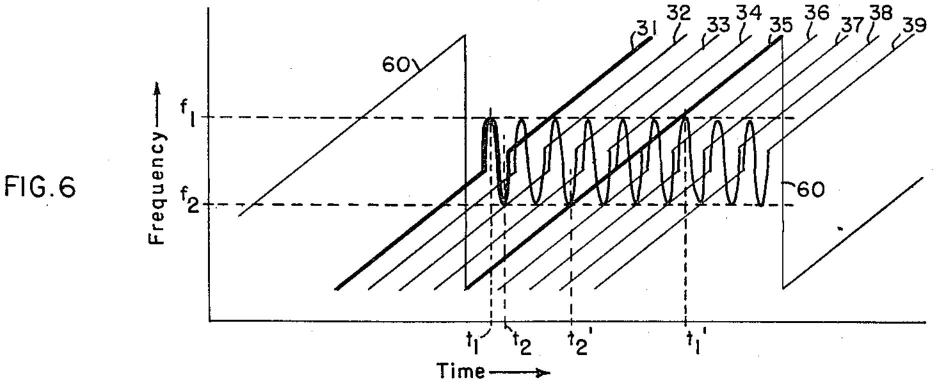

As mentioned, each bit of amplitude information gets a characteristic frequency and is then repeated a certain number of times before another bit of information gets the same frequency. Thus, at these repeated intervals, the amplitude information may be retrieved by causing frequency synchronism within the synchronous detector 61. Referring now to the graph of Fig. 6, there is indicated one manner in which discrete elements of the input signal might be arranged. Thus, assuming that amplitude elements occurring at times $t_1$ and $t_2$ are supplied to the modulator 21 and that one cycle of a sinusoidal-type control signal is supplied to the reactance-tube circuit 22, then instantaneous frequency wiggles are produced in the encoding carrier-frequency sweep as represented by curve 31 of Fig. 6 so that these amplitude elements are encoded at corresponding frequencies $f_1$ and $f_2$. These frequency wiggles in the encoding frequency sweep 31 are, of course, repeated in the images thereof, represented by curves 32–39, inclusive, of Fig. 6, that are reproduced across the common load resistor 50. Now, assuming the decoding frequency sweep 60 varies in a linear manner as before, then frequency synchronism within the synchronous detector 61 occurs in such a manner that the amplitude elements encoded at frequencies $f_1$ and $f_2$ are retrieved and become elements of the output signal at the corresponding times $t_1'$ and $t_2'$. It will be noted that not only has the relative time difference between these amplitude elements been increased, but that the order of occurrence of these amplitude elements has been reversed. This represents a dynamic type of rearrangement of the discrete amplitude elements of an input signal. In a similar manner, by properly choosing the type of control signal to be used, the discrete elements of an input signal may be rearranged in a wide variety of ways.

Some limitation, of course, is imposed on the manner in which discrete amplitude elements of the input signal may be rearranged because of the fact that the frequency sweeps are periodic in nature and, hence, necessitate the requirement that the extended time interval over which each bit of amplitude information is preserved be limited to the sweep period in order to prevent ambiguity. As a result, only neighboring amplitude elements of the input signal, that is, amplitude elements occurring within one sweep period of one another, may be reversed in time with respect to each other. It should be remembered, however, that the period of the frequency sweep, that is, the time interval over which a particular frequency sweep occurs, may be made quite long so that, from a practical standpoint, no serious limitation is imposed on the present system.

For some applications distortion may arise due to the fact that there are a finite number of output terminals associated with the delay network 26. This again depends on the nature of the input signal being translated and the type of delay which it is desired to impart thereto. For applications where distortion does arise, such distortion may be either eliminated or minimized by utilizing the correction circuits represented by the nonlinear amplifier 23, and the modulator 24. In such a case the amplifier 23 is responsive to a suitable characteristic of the control signal supplied by way of terminals 15, 15 in order to supply a correction signal to the modulator 24. Such a correction signal controls the modulator 24 in such a manner as to predistort the amplitude of the carrier signal in such a fashion as to compensate for later distortion introduced in the frequency repeater 12. This type of signal correction technique is suitable because the control signal controls the change in frequency of the oscillator 20, and, hence, the relative times at which amplitude information is extracted from the frequency repeater 12.

In the foregoing operation, linear frequency sweeps were utilized in both the encoding unit 11 and the decoding unit 13. It is, of course, not necessary that the frequency sweeps of either unit be of a linear saw-tooth nature. The linear frequency sweep, however, is a convenient means for correlating operation of the encoding unit 11 and the decoding unit 13 with a minimum of circuitry.

From the foregoing descriptions of the invention, it will be apparent that a variable delay system constructed in accordance with the present invention represents a new and improved system for individually varying the time delay of discrete elements of an electrical input signal in accordance with an electrical control signal.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A variable-delay system for individually varying the time delay of discrete elements of an input signal, the system comprising: circuit means for converting the time positions of discrete elements of the input signal to representative frequencies; circuit means for sustaining the representative frequencies over extended time intervals; and adjustable frequency-selective circuit means for selectively reconverting the representative frequencies to desired time positions within the extended time intervals to produce an output signal composed of the discrete elements of the input signal individually delayed in a desired manner.

2. A variable-delay system for individually varying the time delay of discrete elements of an input signal, the system comprising: circuit means for converting the time positions of discrete elements of the input signal as amplitude modulation of a variable-frequency carrier signal at various representative frequencies thereof; circuit means for sustaining over extended time intervals the various frequency components upon which the discrete elements of the input signal are encoded; and adjustable frequency-selective circuit means for selectively decoding the modulation of the sustained carrier-signal components to produce an output signal composed of the discrete elements of the input signal individually delayed in a desired manner.

3. A variable-delay system for individually varying the time delay of discrete elements of an input signal in accordance with a control signal, the system comprising: circuit means for developing a first carrier signal having a frequency which is adjustable over a predetermined frequency range; circuit means for individually encoding various discrete elements of the input signal as modulation of the carrier signal at various frequencies thereof; circuit means for sustaining the modulated carrier-signal components over extended time intervals; circuit means for developing a second carrier signal having a frequency which is adjustable over the same predetermined frequency range; circuit means responsive to the control signal for controlling the instantaneous difference in frequencies of the first and second carrier signals; and circuit means responsive to the instantaneous frequency of the second carrier signal for selectively decoding the modulation of the sustained carrier-signal component in frequency synchronism therewith to produce an output signal composed of the discrete elements of the input signal individually delayed in a desired manner.

4. A variable-delay system for individually varying the time delay of discrete elements of an input signal in accordance with a control signal, the system comprising: circuit means for developing a first carrier signal having a frequency which is adjustable over a predetermined frequency range; circuit means for individually encoding various discrete elements of the input signal as modulation of the carrier signal at various frequencies thereof; a delay network having a plurality of spaced output terminals for repeating the modulated carrier-signal components with a plurality of different time delays; circuit means for developing a second carrier signal having a frequency which is adjustable over the same predetermined frequency range; circuit means responsive to the control signal for controlling the instantaneous difference in frequencies of the first and second carrier signals; and circuit means responsive to the instantaneous frequency of the second carrier signal for selectively decoding the modulation of the repeated carrier-signal component in frequency synchronism therewith to produce an output signal composed of the discrete elements of the input signal individually delayed in a desired manner.

5. A variable-delay system for individually varying the time delay of discrete elements of an input signal in accordance with a control signal, the system comprising: circuit means for developing a first carrier signal having a frequency which is adjustable over a predetermined frequency range; circuit means for individually encoding various discrete elements of the input signal as modulation of the carrier signal at various frequencies thereof; circuit means for sustaining the modulated carrier-signal components over extended time intervals; circuit means for developing a second carrier signal having a frequency which is adjustable over the same predetermined frequency range; circuit means responsive to the control signal for controlling the instantaneous difference in frequencies of the first and second carrier signals; and a synchronous-type frequency detector responsive to the instantaneous frequency of the second carrier signal for selectively decoding the modulation of the sustained carrier-signal component in frequency synchronism therewith to produce an output signal composed of the discrete elements of the input signal individually delayed in a desired manner.

6. A variable-delay system for individually varying the time delay of discrete elements of an input signal in accordance with a control signal, the system comprising: circuit means for individually encoding various discrete elements of the input signal as modulation of a first variable-frequency carrier signal at various frequencies thereof; circuit means for repeating the modulated carrier-signal components with a plurality of different time delays; circuit means for developing a second carrier signal; frequency-control circuit means for causing the frequencies of the first and second carrier signals to sweep over approximately the same predetermined frequency range; circuit means for supplying the control signal to the frequency control circuit means for adjusting the instantaneous difference in the frequencies of the first and second carrier signals; and circuit means responsive to the instantaneous frequency of the second carrier signal for selectively decoding the modulation of the repeated carrier-signal component in frequency synchronism therewith to produce an output signal composed of the discrete elements of the input signal individually delayed in a desired manner.

7. A variable-delay system for individually varying the time delay of the discrete elements of an input signal in accordance with a control signal, the system comprising: first oscillator circuit means for developing a first carrier signal of variable frequency; circuit means for encoding various discrete elements of the input signal as modulation of the first carrier signal; circuit means for repeating the modulated carrier-signal components with a plurality of different time delays; second oscillator circuit means for developing a second carrier signal; a sweep signal generator for producing periodic sweep signals; a pair of reactance tube circuits responsive to the sweep signals for individually causing the frequencies of the first and second carrier signals to periodically sweep over approximately the same predetermined frequency range; circuit means for supplying the control signal to one of the reactance tube circuits for adjusting the instantaneous difference in the frequencies of the first and second carrier signals; and circuit means responsive to the instantaneous frequency of the second carrier signal for selectively decoding the modulation of the repeated carrier-signal component in frequency synchronism therewith to produce an output signal composed of the discrete element of the input signal individually delayed in a desired manner.

8. A variable-delay system for individually varying the time delay of the discrete elements of an input signal in accordance with a control signal, the system comprising: a first oscillator circuit for developing a first carrier signal of variable frequency; a modulator circuit for encoding various discrete elements of the input signal as modulation of the first carrier signal; a delay network having a plurality of spaced output terminals for repeating the modulated carrier-signal components with a plurality of different time delays; a second oscillator circuit for developing a second carrier signal; a sweep signal generator for producing periodic sweep signals; a pair of reactance tube circuits responsive to the sweep signals for individually causing the frequencies of the first and second carrier signals to periodically sweep over approximately the same predetermined frequency range; circuit means for supplying the control signal to one of the reactance tube circuits for adjusting the instantaneous difference in the frequencies of the first and second carrier signals; and a synchronous frequency detector responsive to the instantaneous frequency of the second carrier signal for selectively decoding the modulation of the repeated carrier-signal component in frequency synchronism therewith to produce an output signal composed of the discrete elements of the input signal individually delayed in a desired manner.

References Cited in the file of this patent

UNITED STATES PATENTS

| | | |
|---|---|---|
| 2,230,212 | Crosby | Jan. 28, 1941 |
| 2,402,059 | Craib | June 11, 1946 |
| 2,530,140 | Atkins | Nov. 14, 1950 |
| 2,539,556 | Steinberg | Jan. 30, 1951 |
| 2,629,856 | Gallay | Feb. 24, 1953 |
| 2,632,057 | Koenig | Mar. 17, 1953 |
| 2,729,790 | Haynes | Jan. 3, 1956 |

FOREIGN PATENTS

| | | |
|---|---|---|
| 486,258 | Italy | Nov. 5, 1953 |